United States Patent
Kambe et al.

(10) Patent No.: US 8,331,337 B2
(45) Date of Patent: Dec. 11, 2012

(54) SESSION MANAGEMENT APPARATUS, COMMUNICATION SYSTEM, AND SESSION CLEAR-OUT METHOD

(75) Inventors: Toshiyuki Kambe, Tokyo (JP); Akira Yanagisawa, Tokyo (JP)

(73) Assignee: NEC Corporation, Tokyo (JP)

( * ) Notice: Subject to any disclaimer, the term of this patent is extended or adjusted under 35 U.S.C. 154(b) by 528 days.

(21) Appl. No.: 12/485,469

(22) Filed: Jun. 16, 2009

(65) Prior Publication Data
US 2009/0262686 A1    Oct. 22, 2009

(30) Foreign Application Priority Data
Jun. 18, 2008    (JP) ................. 2008-159138

(51) Int. Cl.
*H04W 4/00* (2009.01)
*H04W 40/00* (2009.01)

(52) U.S. Cl. ....................... 370/338; 455/444
(58) Field of Classification Search ........... None
See application file for complete search history.

(56) References Cited

U.S. PATENT DOCUMENTS

| | | |
|---|---|---|
| 7,974,630 B1 | 7/2011 | Haumont et al. |
| 2002/0172178 A1 | 11/2002 | Suzuki et al. |
| 2007/0112954 A1* | 5/2007 | Ramani et al. ............... 709/224 |
| 2007/0249372 A1* | 10/2007 | Gao et al. ...................... 455/466 |
| 2009/0207805 A1* | 8/2009 | Zou .............................. 370/331 |

FOREIGN PATENT DOCUMENTS

| | | |
|---|---|---|
| JP | 2002330489 A | 11/2002 |
| JP | 2003018327 A | 1/2003 |
| JP | 2003501974 A | 1/2003 |
| JP | 2003037874 A | 2/2003 |
| JP | 2006195690 A | 7/2006 |
| JP | 2008028996 A | 2/2008 |

OTHER PUBLICATIONS

Japanese Office Action for JP2008-159138 mailed on Sep. 11, 2012.

* cited by examiner

*Primary Examiner* — Marcus R Smith

(57) ABSTRACT

Session management means holds session information concerning sessions for fixed terminals and sessions for mobile terminals including type information indicating a terminal type and status information indicating the status of communication. Session clear-out means disconnects a session the type information for which indicates a mobile terminal and in which communication has not been performed for a time period longer than or equal to a first monitoring time period, on the basis of the session information held in the session management means.

13 Claims, 4 Drawing Sheets

| SESSION ID | TERMINAL TYPE | LAST ACCESS TIME |
|---|---|---|
| a | FIXED | YY-MM-DD xx:xx:xx |
| b | MOBILE | YY-MM-DD yy:yy:yy |
| : | : | : |

SESSION MANAGEMENT APPARATUS, COMMUNICATION SYSTEM, AND SESSION CLEAR-OUT METHOD

This application is based upon and claims the benefit of priority from Japanese Patent Application No. 2008-159138 filed on Jun. 18, 2008, the content of which is incorporated by reference.

BACKGROUND OF THE INVENTION

1. Field of the Invention

The present invention relates to a wireless communication system including fixed and mobile wireless terminals that connect to base station apparatuses.

2. Description of the Related Art:

In a WiMAX (Worldwide Interoperability for Microwave Access) system that enables communications in various places by covering communication areas by multiple base station apparatuses, wireless terminals establish a session through a base station apparatus to perform communication. By establishing sessions, communications having a guaranteed quality can be continuously performed.

However, a wireless terminal in the WiMAX system can move out of the coverage area of a base station apparatus. If a wireless terminal which has established a session moves out of the coverage area of the base station and becomes and remains unreachable for some time, the wireless terminal autonomously disconnects the call but information about the session remains in the WiMAX system. It is disadvantageous for session management and band management if information about a session that is no longer used for communication remains in the system. Therefore it is necessary to clear out residual session information.

A known typical method for clearing out a residual session is to forcibly disconnect the session in which no communication has been performed for a period longer than or equal to a predetermined time period (see Japanese Patent Laid-Open No. 2002-330489 or No. 2008-28996). By using the technique, session information remaining in a system can be cleared from the system.

On the other hand, depending on the nature of an application used, no communication may be performed for a long period of time under normal conditions. The technique disclosed in Japanese Patent Laid-Open No. 2002-330489 or No. 2008-28996 can disconnect a session in which no communication has been performed for a long period of time under normal conditions. This is a problem for an application, for example, that runs based on the precondition that the session will continue. There is a technique that sends data for maintaining a session to prevent forced disconnection of the session (see Japanese Patent Laid-Open No. 2006-195690).

Mobile wireless terminals (hereinafter referred to as "mobile terminals") and fixed wireless terminals (hereinafter referred to as "fixed terminals") coexist in a WiMAX system. Terminals that move out of the coverage of a base station apparatus while maintaining a session are mainly mobile terminals and fixed terminals are less likely to exit from the coverage of a base station terminal.

If any sessions, during which no communication has been performed for a predetermined time period or longer, are forcibly disconnected regardless of whether the terminals are fixed or are mobile terminals, most residual sessions of mobile terminals can be cleared out but sessions of fixed terminals during which no communication has been performed under normal conditions in most cases will be disconnected. Consequently, for a fixed terminal that is in the on state in the nighttime, for example, disconnection from and reentry into a session are repeated, which can squeeze the system bandwidth and place an extra load on an authentication server.

On the other hand, if every wireless terminal sends data for maintaining a session in order to prevent forced disconnection of the session, the traffic on the network will increase.

SUMMARY OF THE INVENTION

An exemplary object of the present invention is to provide a technology for properly maintaining a normal session and for clearing out a residual session in a wireless communication system in which mobile terminals and fixed terminals coexist.

In order to achieve the object, a session management apparatus according to an exemplary aspect of the invention includes:

session management means for holding, for a session for a fixed terminal and for a session for a mobile terminal, session information including type information indicating a terminal type and status information indicating the status of communication; and session clear-out means for disconnecting, on the basis of the session information held in the session management means, a session for which the type information indicates a mobile terminal, and in which no communication has been performed for a time period longer than or equal to a first monitoring time period.

A communication system according to another exemplary aspect of the invention includes:

a fixed terminal connected to a core network through a radio access network;

a mobile terminal connected to the core network through the radio access network and performs communication while a session is established, in such a manner that the time during which no communication is performed does not exceed a predetermined maximum communication interval; and a session management apparatus which holds, for a session for the fixed terminal and for a session for the mobile terminal, session information including type information indicating a terminal type and status information indicating the status of communication and disconnects, on the basis of the session information, a session for which the type information indicates a mobile terminal and in which no communication has been performed for a time period longer than or equal to a first monitoring time period.

A session clear-out method according to another exemplary aspect of the invention includes:

holding, for a session for a fixed terminal and for a session for a mobile terminal, session information including type information indicating a terminal type and status information indicating the status of communication; and disconnecting, on the basis of the session information, a session for which the type information indicates a mobile terminal and in which no communication has been performed for a time period longer than or equal to a first monitoring time period.

The above and other objects, features, and advantages of the present invention will become apparent from the following description with references to the accompanying drawings which illustrate examples of the present invention.

DETAILED DESCRIPTION OF THE PREFERRED EMBODIMENTS:

Exemplary embodiments will be described in detail with reference to the accompanying drawings.

Figure 1:
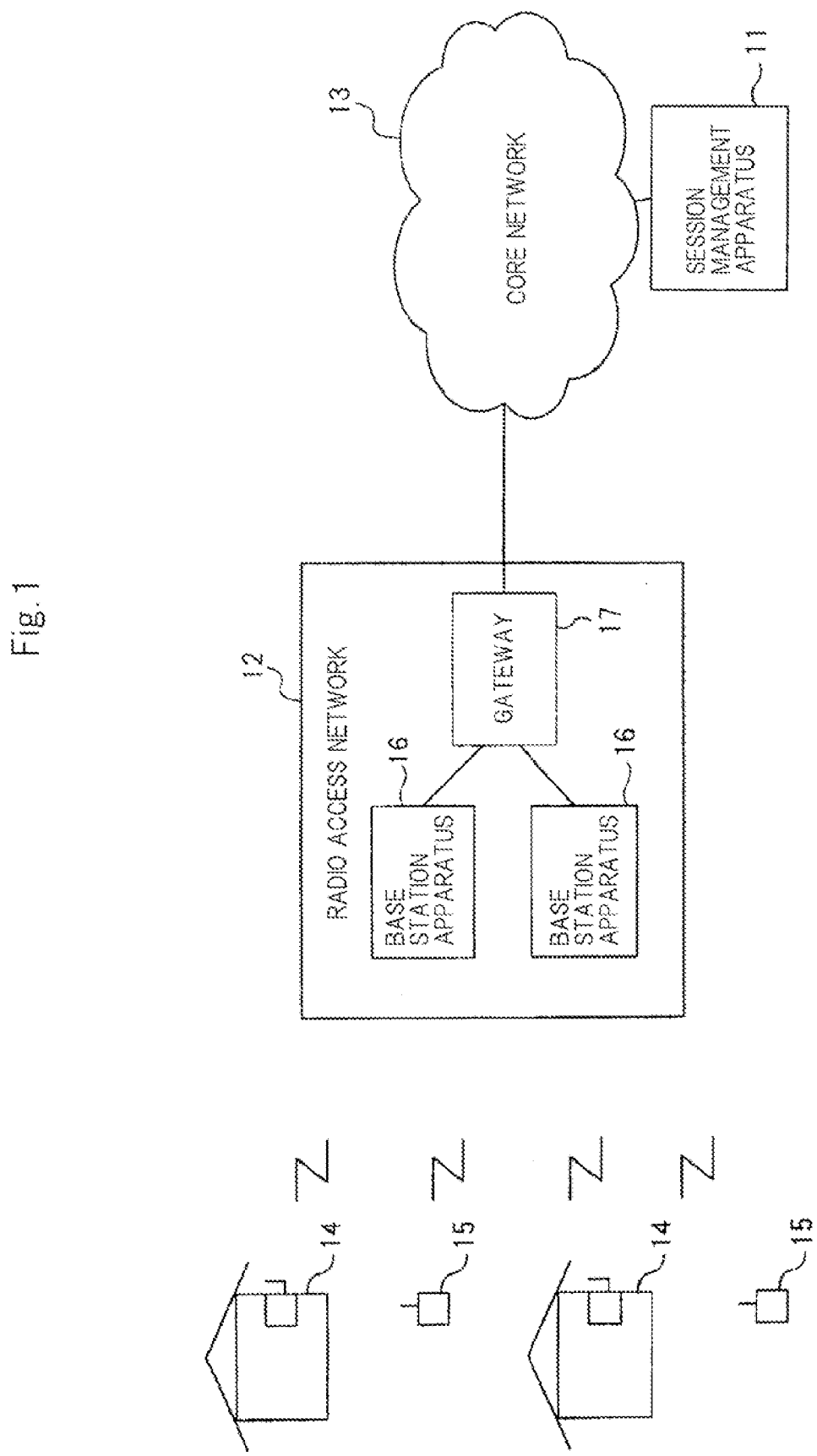
FIG. 1 is a block diagram showing a configuration of a wireless communication system according to an exemplary embodiment.

FIG. 1 is a block diagram showing a wireless communication system according to an exemplary embodiment. Referring to FIG. 1, the wireless communication system includes session management apparatus 11, fixed terminals 14, and mobile terminals 15.

Session management apparatus 11 is connected to core network 13. Fixed terminals 14 and mobile terminals 15 are connected to radio access network 12. Radio access network 12 and core network 13 are interconnected.

Fixed terminals 14 are wireless terminals stationarily installed in places such as buildings. Mobile terminals 15 are carried by users and are used while the user is moving. Fixed terminals 14 and wireless terminals 15 connect to radio access network 12 through wireless links, establish sessions on core network 13 through radio access network 12, and perform data communication through the sessions.

Mobile terminals 15 perform communication while the sessions are established in such a manner that the time period during which communication is not performed does not exceed a predetermined time (the maximum communication interval). For example, mobile terminal 15 may periodically send a "Keep Alive" message at the maximum communication intervals or shorter intervals. Alternatively, mobile terminal 15 may send a "Keep Alive" message after mobile terminal 15 has sent no data for the maximum communication interval. The "Keep Alive" message may be any signal that updates session information and may contain any information. Fixed terminals 14 do not have to send the "Keep Alive" message or may send the "Keep Alive" message like mobile terminals 15.

Core network 13 provides a communication link for data communication performed by wireless terminals, including fixed terminals 14 and mobile terminals 15, and transfers data using the Internet protocol.

Radio access network 12 includes base station apparatuses 16 and gateway apparatus 17. Base station apparatuses 16 connect to fixed terminal 14 or mobile terminal 15 through a wireless link and relays data communication between the terminal and core network 13. Gateway apparatus 17 is a control gate that connects base station apparatuses 16 to core network 13.

Session management apparatus 11 manages a session that connects fixed terminal 14 or mobile terminal 15 to core network 13. Session management apparatus 11 holds session information about sessions both for fixed terminals 14 and for mobile terminals 15 and disconnects, on the basis of the session information, a session the type information of which indicates mobile terminal 15 and in which no communication has been performed for a predetermined monitoring time period or longer. The session information includes type information indicating the type of a terminal and status information indicating the status of communication. The status information may be time information indicating the time at which the last communication was performed, for example. The time information is updated each time communication is performed. In that case, session management apparatus 11 may determine on the basis of the time indicated by the time information and the current time whether no communication has been performed for a time period longer than or equal to the predetermined monitoring time.

Figures 2, 3:
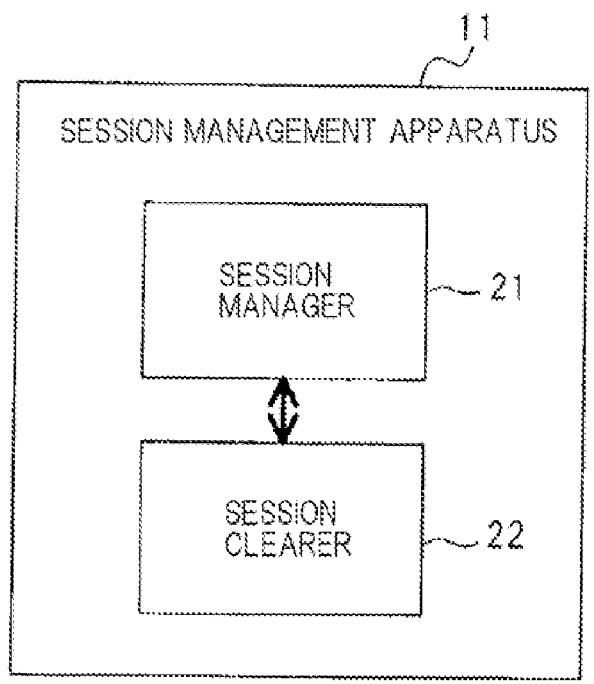
FIG. 2 is a block diagram showing a configuration of session management apparatus 11.
FIG. 3 is a diagram showing an example of session information held in session manager 21.

FIG. 2 is a block diagram showing a configuration of session management apparatus 11. Referring to FIG. 2, session management apparatus 11 includes session manager 21 and session clearer 22. Session manager 21 holds the session information described above. Based on the session information held in the session manager 21, session clearer 22 extracts a session the type of which is mobile and in which no communication has been performed for the predetermined monitoring time period or longer and disconnects the session.

FIG. 3 shows an example of the session information held in session manager 21. In the entry of each session, a session ID (identifier) uniquely identifying the session, the terminal type indicating which of fixed terminal 14 or mobile terminal 15 has established the session, and the last access time indicating the time at which the last communication was performed are recorded as the session information. Session clearer 22 can refer to the terminal type to extract a session of mobile terminal 15 and can refer to the last access time to know how long the session has been in an out-of-communication state.

Figure 4:
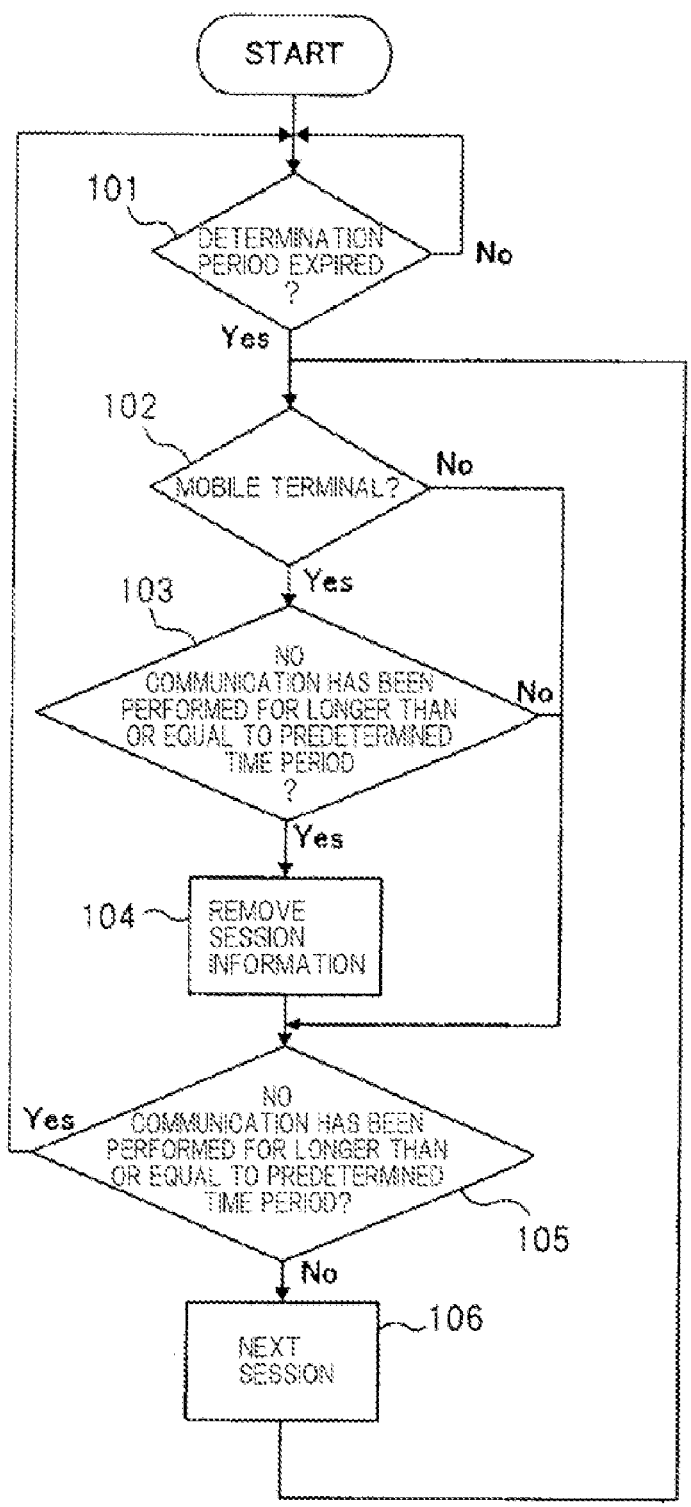
FIG. 4 is a flowchart showing exemplary operation of session clearer 22.

FIG. 4 is a flowchart showing exemplary operation of session clearer 22. Referring to FIG. 4, session clearer 22 monitors for expiration of a predetermined determination period (step 101) and performs the following operation at determination periods. First, session clearer 22 selects one session entry from the session information and refers to terminal type to determine whether or not the session is a mobile terminal 15 session (step 102). If the selected session is mobile terminal 15 session, the session clearer 22 refers to the last access time of the session and determines from the last access time indicated and the current time whether no communication has been performed for a time period longer than or equal to the predetermined monitoring time period (step 103).

If no communication has been performed for the predetermined monitoring time period or longer, session clearer 22 disconnects the session (step 104). Session clearer 22 may delete session information about that session that is held by session manager 21 to forcibly disconnect the session. Alternatively, session clearer 22 may perform a predetermined session disconnection procedure to cause normal disconnection of the session.

If the session is not mobile terminal 15 session at step 102 or if the time for which no communication has been performed is not equal to or longer than the predetermined monitoring time period at step 103, or after completion of step 104, session clearer 22 determines whether the process from step 102 to step 104 has been performed for all sessions for which session information is held in session manager 21 (step 105). If the process has been completed for all sessions, session clearer 22 returns to step 101.

If the process has not been completed for all sessions, session clearer 22 selects the next session (step 106) and returns to step 102.

Figure 5:
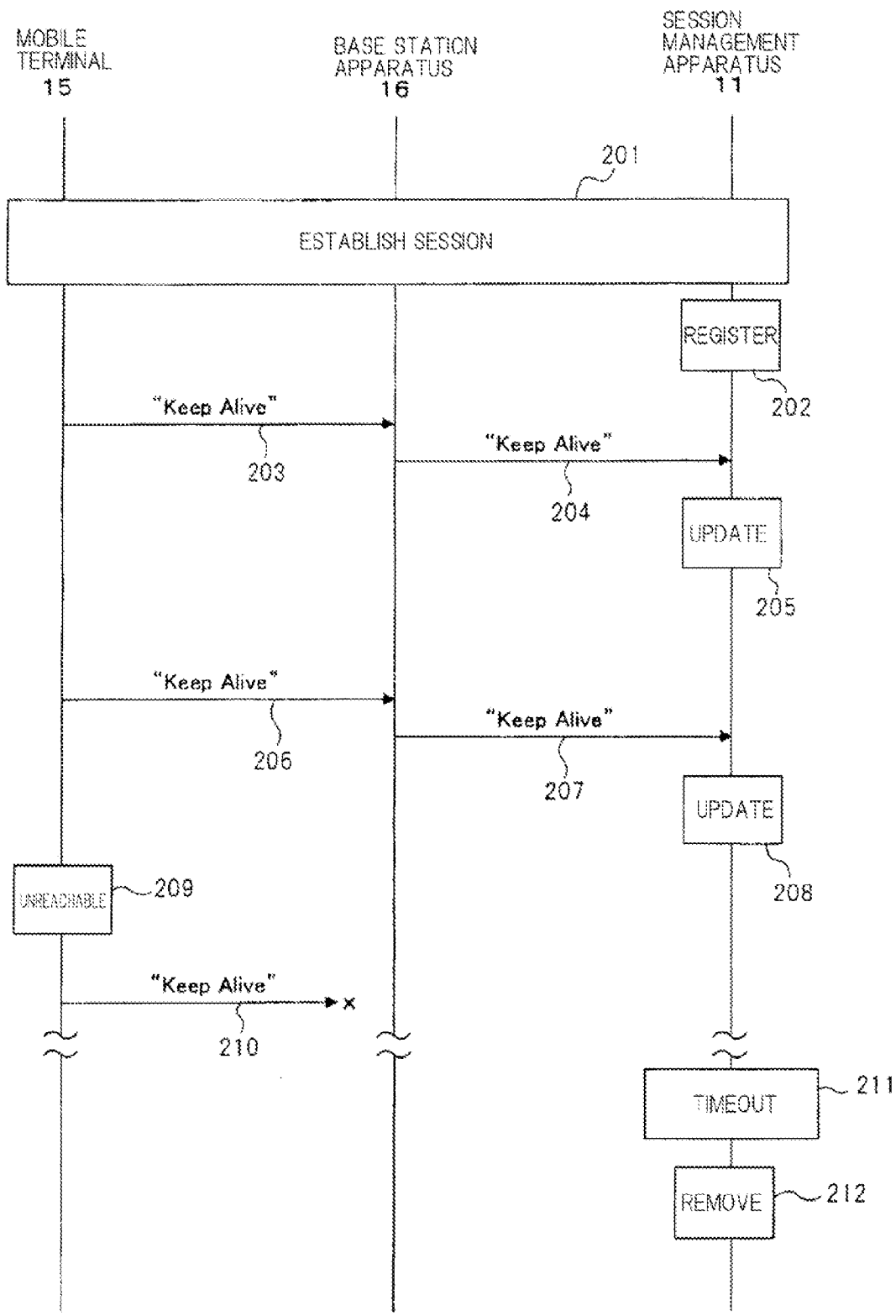
FIG. 5 is a sequence chart showing exemplary operation of the communication system according to the exemplary embodiment.

FIG. 5 is a sequence chart showing exemplary operation of the communication system according to the exemplary embodiment. In the example in FIG. 5, upon establishment of a session for mobile terminal 15 (step 201), session information concerning the session is registered in session management apparatus 11 (step 202).

Session management apparatus 11 monitors the session of mobile terminal 15 among sessions for which session information is registered to determine whether the time for which no communication has been performed is longer than or equal to the predetermined monitoring time period.

While the session is established, mobile terminal 15 periodically sends a "Keep Alive" message so that the time period during which communication is not being performed exceeds the maximum communication interval (steps 203 and 206). The "Keep Alive" message is provided to session management apparatus 11 through base station apparatus 16 (steps 204 and 207). Session management apparatus 11 updates the last access time in the session information each time the "Keep Alive" message is sent (steps 205 and 208). The session during which the "Keep Alive" message is successfully being transmitted is not detected as a session in which no communication has been performed for the predetermined time period or longer.

It is assumed here that mobile terminal 15 moves out of the coverage area (step 209). Accordingly, the "Keep Alive" message sent from mobile terminal 15 is not transferred (step 210) or mobile terminal 15 detects that mobile terminal 15 has moved out of the coverage area and forcibly disconnects the session to stop sending the "Keep Alive" message. Consequently, session management apparatus 11 detects that communication has not been performed for predetermined monitoring time period or longer (step 211) and disconnects the session (step 212).

According to the exemplary embodiment, in a system in which a session of fixed terminal 14 and a session of mobile terminal 15 coexist, after no communication has been performed for a predetermined monitoring time period or longer in the session of mobile terminal 15, the session is disconnected as described above. Therefore, normal sessions can be properly maintained and residual sessions can be properly cleared out by making distinction between fixed terminal 14 and mobile terminal 15.

In the exemplary embodiment described above, only sessions of mobile terminals 15 are disconnected after no communication has been performed for a predetermined monitoring time period or longer by taking into consideration differences in behavior between fixed terminal 14 and mobile terminal 15 in a system in which fixed terminals 14 and mobile terminals 15 coexist. However, the present invention is not so limited. In an alternative exemplary embodiment, a fixed-terminal monitoring time that is longer than mobile-terminal monitoring time may be introduced for fixed terminals 14 and, after no communication has been performed for the monitoring time or longer in a session of fixed terminal 14, the session may be disconnected. For example, the mobile-terminal monitoring time may be set in minutes or hours and the fixed-terminal monitoring time may be set in days, so that the frequency of session disconnections and reentries for fixed terminals 14 can be kept low while sessions of fixed terminals 14 that actually failed or were otherwise discontinued but still remain can be removed.

While no mention is made of differences in character among cells of a system consisting of multiple cells like WiMAX in the description of the exemplary embodiments, the present invention may be configured by taking into consideration differences in character among cells. In general, the densities of and ratio between mobile terminals 14 and fixed terminals 15 differ from region to region. Consequently, the number of residual sessions and the degree of influence of residual sessions on the system may differ among regions. Therefore, the monitoring time period (which may include a fixed-terminal monitoring time period and a mobile-terminal monitoring time) for determining whether a session should be disconnected or not may be allowed to be set for each individual cell. For example, a shorter monitoring time may be set for a region where many residual sessions occur or a region where the ratio of the band occupied by residual sessions is high, in order to facilitate removal of residual sessions. Alternatively, a shorter mobile-terminal monitoring time and a longer fixed-terminal monitoring time may be set for a region where the ratio of the mobile terminals 14 is high in order to especially facilitate removal of residual sessions of mobile terminals 14.

Having described exemplary embodiments, it should be understood that the present invention is not limited to these exemplary embodiments. Any combinations of the exemplary embodiments may be used and modifications may be made to the exemplary embodiments without departing from the scope of the technical idea of the present invention.

While preferred exemplary embodiments of the present invention have been described using specific terms, such description is for illustrative purposes only, and it is to be understood that changes and variations may be made without departing from the spirit or scope of the following claims.

What is claimed is:

1. A session management apparatus comprising:
    a session management unit that holds, for a session for a fixed terminal and for a session for a mobile terminal, session information including type information indicating a terminal type and status information indicating the status of communication; and
    a session clear-out unit that disconnects, on the basis of the session information held in the session management unit, a session for which the type information indicates a mobile terminal and in which no communication has been performed for a time period longer than or equal to a first monitoring time period,
    wherein the session clear-out unit further disconnects a session the type information of which indicates a fixed terminal and in which no communication has been performed for a time period longer than or equal to a second monitoring time that is period longer than the first monitoring time period.

2. The session management apparatus according to claim 1, wherein
    the status information is updated when communication is performed; and
    the session clear-out unit determines on the basis of update status of the status information whether no communication has been made for a time period longer than or equal to the first monitoring time period.

3. The session management apparatus according to claim 2, wherein
    the status information is time information indicating the time at which the latest communication has been performed; and
    the session clear-out unit determines on the basis of the time indicated by the time information and the current time whether no communication has been performed for a time period longer than or equal to the first monitoring time period.

4. The session management apparatus according to claim 1, wherein the session clear-out unit extracts at every predetermined determination interval a session the type information of which indicates a mobile terminal and in which no communication has been performed for a time period longer than or equal to the first monitoring time period.

5. The session management apparatus according to claim 1, wherein there are a plurality of cells to which the fixed terminal or the mobile terminal can be connected and the monitoring time period for determining whether a session is to be disconnected or not is set for each of the plurality of cells.

6. The session management apparatus according to claim 1, wherein the status information comprises time information indicating a time at which a last communication was performed.

7. A communication system comprising:
a fixed terminal connected to a core network through a radio access network;
a mobile terminal connected to the core network through the radio access network and performs communication while a session is established, in such a manner that the time during which no communication is performed does not exceed a predetermined maximum communication interval; and
a session management apparatus which holds, for a session for the fixed terminal and for a session for the mobile terminal, session information including type information indicating a terminal type and status information indicating the status of communication and disconnects, on the basis of the session information, a session for which the type information indicates a mobile terminal and in which no communication has been performed for a time period longer than or equal to a first monitoring time period,
wherein the session management apparatus further disconnects a session the type information of which indicates a fixed terminal and in which no communication has been performed for a time period longer than or equal to a second monitoring time period that is longer than the first monitoring time period.

8. The communication system according to claim 7, wherein
the status information is updated when communication is performed; and
the session management apparatus determines on the basis of update status of the status information whether no communication has been made for a time period longer than or equal to the first monitoring time period.

9. The communication system according to claim 7, wherein
the status information is time information indicating the time at which the latest communication has been performed; and
the session management apparatus determines on the basis of the time indicated by the time information and the current time whether no communication has been performed for a time period longer than or equal to the first monitoring time period.

10. The communication system according to claim 7, wherein the session management apparatus extracts at every predetermined determination interval a session the type information of which indicates a mobile terminal and in which no communication has been performed for a time period longer than or equal to the first monitoring time period.

11. The communication system according to claim 7, wherein there are a plurality of cells to which the fixed terminal or the mobile terminal can be connected and the monitoring time period for determining whether a session is to be disconnected or not is set for each of the plurality of cells.

12. A session clear-out method comprising:
holding, for a session for a fixed terminal and for a session for a mobile terminal, session information including type information indicating a terminal type and status information indicating status of communication; and
disconnecting, on the basis of the session information, a session for which the type information indicates a mobile terminal and in which no communication has been performed for a time period longer than or equal to a first monitoring time period; and
disconnecting a session the type information of which indicates a fixed terminal and in which no communication has been performed for a time period longer than or equal to a second monitoring time that is period longer than the first monitoring time period.

13. The communication system according to claim 7, wherein the status information comprises time information indicating a time at which a last communication was performed.

* * * * *